US012623104B2

(12) United States Patent
Giffin et al.

(10) Patent No.: US 12,623,104 B2
(45) Date of Patent: May 12, 2026

(54) ANECHOIC CHAMBER FIRE PROTECTION SYSTEM

(71) Applicant: Fike Corporation, Blue Springs, MO (US)

(72) Inventors: Corry Giffin, Grain Valley, MO (US); Gene Hill, Odessa, MO (US); Devang Patel, Luton (GB); Bradford T. Stilwell, Blue Springs, MO (US)

(73) Assignee: Fike Corporation, Blue Springs, MO (US)

(*) Notice: Subject to any disclaimer, the term of this patent is extended or adjusted under 35 U.S.C. 154(b) by 522 days.

(21) Appl. No.: 18/148,167

(22) Filed: Dec. 29, 2022

(65) Prior Publication Data

US 2023/0211197 A1 Jul. 6, 2023

Related U.S. Application Data

(60) Provisional application No. 63/295,640, filed on Dec. 31, 2021.

(51) Int. Cl.

| | |
|---|---|
| ***A62C 35/68*** | (2006.01) |
| ***A62C 3/00*** | (2006.01) |
| ***A62C 31/02*** | (2006.01) |

(52) U.S. Cl.

CPC ................ *A62C 35/68* (2013.01); *A62C 3/00* (2013.01); *A62C 31/02* (2013.01)

(58) Field of Classification Search

CPC ........... A62C 31/22; A62C 31/02; E04B 1/84; E04B 1/94; E04B 1/8404

See application file for complete search history.

(56) References Cited

U.S. PATENT DOCUMENTS

| | | | | |
|---|---|---|---|---|
| 5,501,282 A * | 3/1996 | Sundholm | A62C 31/02 169/37 |
| 2017/0291052 A1* | 10/2017 | Guardiano | A62C 31/22 |

FOREIGN PATENT DOCUMENTS

| | | |
|---|---|---|
| CN | 102195244 | 9/2011 |
| CN | 210521611 | 5/2020 |
| JP | H0631759 | 4/1994 |

OTHER PUBLICATIONS

European Search Report for corresponding application EP22217363.5 dated May 12, 2023.

* cited by examiner

*Primary Examiner* — Tuongminh N Pham

(74) *Attorney, Agent, or Firm* — Hovey Williams LLP

(57) ABSTRACT

A nozzle box unit forming a component of an anechoic chamber fire suppression system is provided. The nozzle box unit includes a pusher assembly that is configured to dislodge a piece of acoustic material positioned in front of the nozzle box so as to permit discharge of a fire suppressing material from a nozzle mounted inside the nozzle box unit into the anechoic chamber.

30 Claims, 10 Drawing Sheets

ANECHOIC CHAMBER FIRE PROTECTION SYSTEM

CROSS-REFERENCE TO RELATED APPLICATIONS

The present application claims the priority benefit of U.S. Provisional Patent Application Ser. No. 63/295,640, filed Dec. 31, 2021, entitled ANECHOIC CHAMBER FIRE PROTECTION SYSTEM, incorporated by reference in its entirety herein.

BACKGROUND OF THE INVENTION

Field of the Invention

Embodiments of the present invention are directed towards apparatus used in the implementation of fire suppression systems for the protection of anechoic chambers. In one particular embodiment, a nozzle box unit is provided having a pusher assembly that is configured to dislodge a piece of acoustic material positioned in front of the nozzle box.

Description of the Prior Art

Anechoic chambers are rooms designed to absorb sound and electromagnetic waves from both interior and exterior sources. Often, anechoic chambers are isolated from waves entering from outside of the chamber. Within the chambers, tiles of acoustically absorbent or radiation absorbent material, depending upon the application for the room and usually in the form of pyramid-shaped cones, are installed on at least some of the wall, ceiling, and/or floor surfaces of the room. A person or detection equipment positioned within the room exclusively hears only direct sounds (or is exposed only to direct radiation), with there being no reverberant sounds or radiation. Thus, the anechoic chamber simulates an infinitely large room.

Where fire protection of the chamber and its contents is required, gaseous clean agent fire suppression systems are commonly installed as the primary form of protection. There two main problems associated with the installation of a fire suppression system in an anechoic chamber. First, the piping associated with the system may produce undesirable reflections within the chamber. Second, any penetrations through the chamber walls may destroy the chamber's shield integrity and lead to entry of externally generated waves into the chamber. In addition, each penetration can act as an antenna, allowing signals generated within the chamber to be transmitted to the exterior of the chamber.

In past fire suppression systems, mounting boxes containing nozzles connected to a source of a fire suppressing agent were installed entirely outside of the anechoic chamber walls. The mounting box was covered by an absorber cone that was frictionally held in place by surrounding cones. In the event of a fire, the fire suppressing agent would be delivered to the nozzle, and the spray emitted by the nozzle would dislodge the cone and permit the agent to be discharged freely into the chamber. System development assumed that a two-foot by two-foot cone would be directly centered in front of the mounting box. However, in reality, this was not always the case as the random placement of mounting boxes in the protected space often meant that parts of absorber cones ended up being patched together to sit in front of the mounting box. This scenario leads to different force requirements to dislodge these non-standard absorber cones. Thus, it could be very difficult to match the force required to dislodge the cones with the force of the agent dispensed through the nozzle. In order to ensure the cone is ejected, the contact surfaces of the cone and surrounding cones were often lined with a low-friction material, such as Formica™, to reduce the friction forces holding the cone in place, and thereby permit removal of the cone with lower applied force from the discharged agent.

As is customary, fire suppression systems are generally tested periodically to ensure operational readiness. As a part of the testing of conventional systems, to ensure that the cone will be removed during discharge, each cone that is to be ejected must be tested with a force gauge to confirm that a minimum force of 29 lbf or less is required to remove the cone. This testing is tedious in that some anechoic chambers are very large in size, e.g., to accommodate an airplane, and require workers to position themselves high off the ground.

In the past, the clean agents used for fire protection systems associated with anechoic chambers have been halocarbon compounds such as HFC-227ea or HFC-125 fire suppression agents. These agents are advantageous in that they are introduced into the chamber as a gas and are readily dispersed. However, the use of these compounds has become disfavored due to their perceived impact on climate change. The EPA has issued the AIM (American Innovation and Manufacturing) Act which reduces the amount HFC fire suppression agents that can be sold in the US. Thus, there is a desire to use more environmentally friendly suppressing agents, including fluorinated ketones such as FK-5-1-12. These fluorinated ketones have a drawback in that they can have much higher boiling points than traditional halocarbon compounds. Therefore, the fluorinated ketones may be discharged from the nozzles in liquid form and then evaporate post-discharge.

The potential for discharge of liquid into the anechoic chamber creates other concerns, too. For example, if care is not taken, the liquid agent may contact portions of the mounting box and/or chamber walls and tiles and not appropriately disperse into the chamber.

Therefore, a need exists in the art for a different strategy of fire suppression in anechoic chambers that can accommodate the use of higher boiling point fluorinated ketones, ensure dislodgment of the acoustic cones, avoid contact of the liquid agents with mounting box and chamber surfaces, and permit easier testing of operational readiness.

SUMMARY OF THE INVENTION

According to one embodiment of the present invention there is provided a nozzle box unit comprising a nozzle box configured to hold a nozzle operable to deliver a fire suppressing material into an anechoic chamber. The nozzle box comprises wall structure defining a compartment inside of which the nozzle is located, and an open face that is configured to permit communication between the compartment and an anechoic chamber external to the nozzle box. A selectively actuatable pusher assembly is provided that is shiftable between a retracted position and an extended position. The pusher assembly is configured to dislodge a piece of acoustic material mounted in front of the nozzle box open face upon shifting from the retracted position to the extended position thereby permitting discharge of the fire suppressing material from the nozzle into the anechoic chamber.

According to another embodiment of the present invention there is provided a fire suppression system for an anechoic chamber. The fire suppression system comprises at least one nozzle box having wall structure defining a compartment, and an open face that is configured to permit communication between the compartment and the anechoic chamber. The system further comprises a nozzle located within the compartment that is fluidly connected to a source of a fire suppressing material. The nozzle is configured to discharge a stream of the fire suppressing material into the anechoic chamber. A selectively actuatable pusher assembly is provided that is shiftable between a retracted position and an extended position. The pusher assembly is operable to dislodge a piece of acoustic material mounted in front of the nozzle box open face within the anechoic chamber upon shifting from the retracted position to the extended position thereby permitting discharge of the fire suppressing material from the nozzle into the anechoic chamber.

According to still another embodiment of the present invention there is provided a method of suppressing a fire within an anechoic chamber comprising a plurality of pieces of acoustic material mounted to one or more walls defining the chamber. The method comprises detecting within the anechoic chamber one or more conditions indicative of a fire event. A flow of a fire suppressing material from a fire suppressing material reservoir located external to the anechoic chamber toward at least one nozzle box is initiated. The at least one nozzle box comprises wall structure defining a compartment, and an open face that is configured to permit communication between the compartment and the anechoic chamber. A nozzle is located within the compartment that is fluidly connected to the reservoir. A selectively actuatable pusher assembly is provided that is shiftable between a retracted position and an extended position. The pusher assembly is further operable to dislodge at least one of the plurality of pieces of acoustic material that is mounted in front of the nozzle box open face. The pusher assembly is caused to shift from the retracted position to the extended position. This shifting dislodges at least one of the plurality of pieces of acoustic material that is mounted in front of the nozzle box open face thereby unblocking the open face of at least one nozzle box. The fire suppressing material is then discharged through the nozzle into the anechoic chamber.

Figure 1:
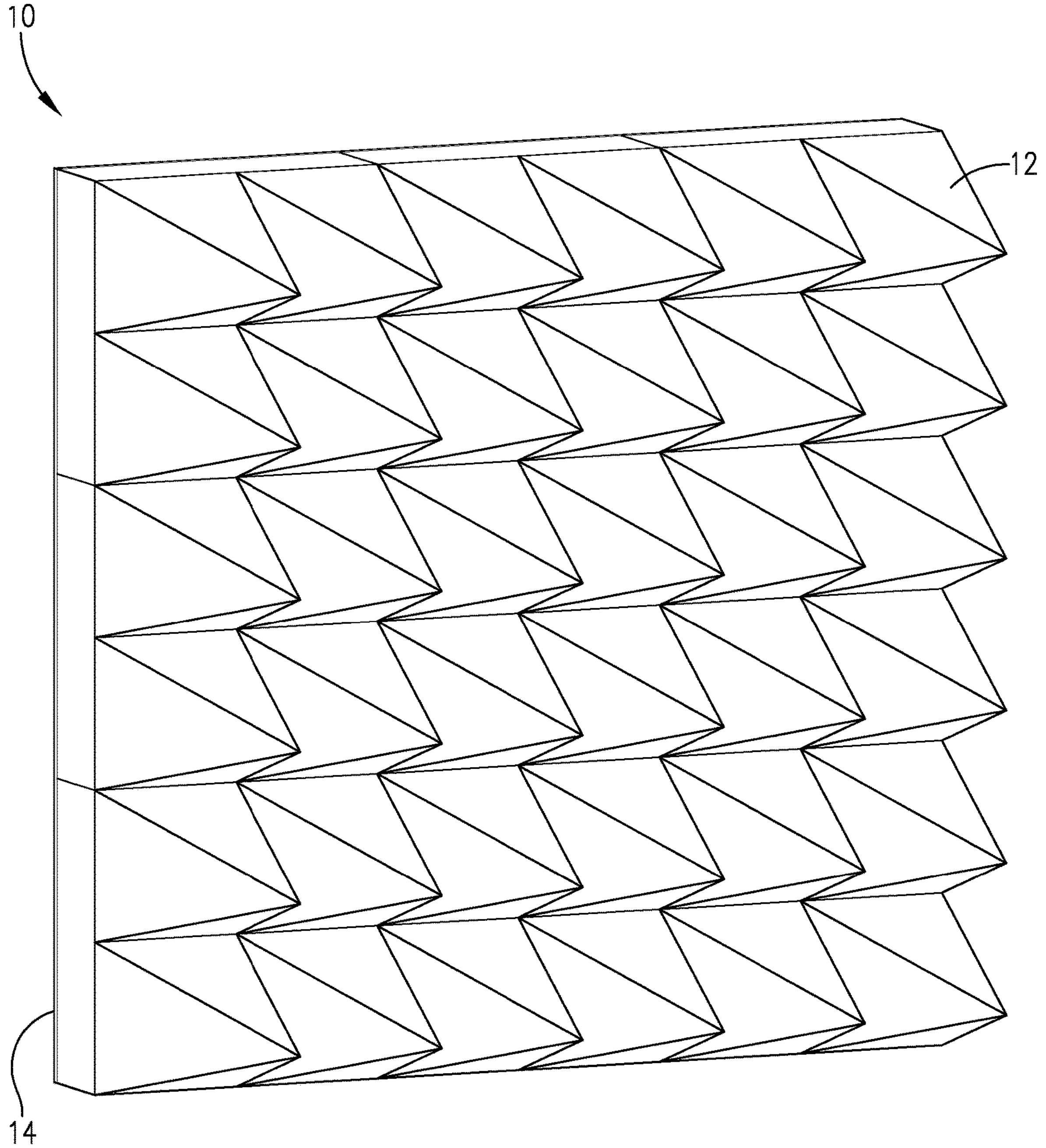
FIG. 1 is a schematic view of a wall section comprising an anechoic chamber.

While the drawings do not necessarily provide exact dimensions or tolerances for the illustrated components or structures, the drawings are to scale with respect to the relationships between the components of the structures illustrated in the drawings.

DETAILED DESCRIPTION OF THE PREFERRED EMBODIMENT

Turning to FIG. 1, an anechoic chamber wall section 10 is depicted. Wall section 10 comprises a plurality of pieces of acoustic material 12, also commonly referred to as acoustic tiles, affixed to a wallboard 14. As used herein, the term "acoustic material" refers collectively to materials that absorbs sound waves and also to radiation-absorbent materials that are capable of absorbing incident electromagnetic radiation, such as radio frequency radiation. The acoustic material 12 may be in the form of cones, as depicted in FIG. 1, or any other shape as suitable for a particular application. In one or more embodiments, the acoustic material 12 does not include any film, layer, or coating whose purpose is to reduce friction with an adjacent piece of acoustic material, such as Formica™. The wallboard 14 may be any suitable material used to construct walls of an anechoic chamber, such as drywall, plywood, or other manufactured structural material. Conventionally, the anechoic chamber walls comprise plywood that is clad with steel, particularly galvanized steel.

Figure 2:
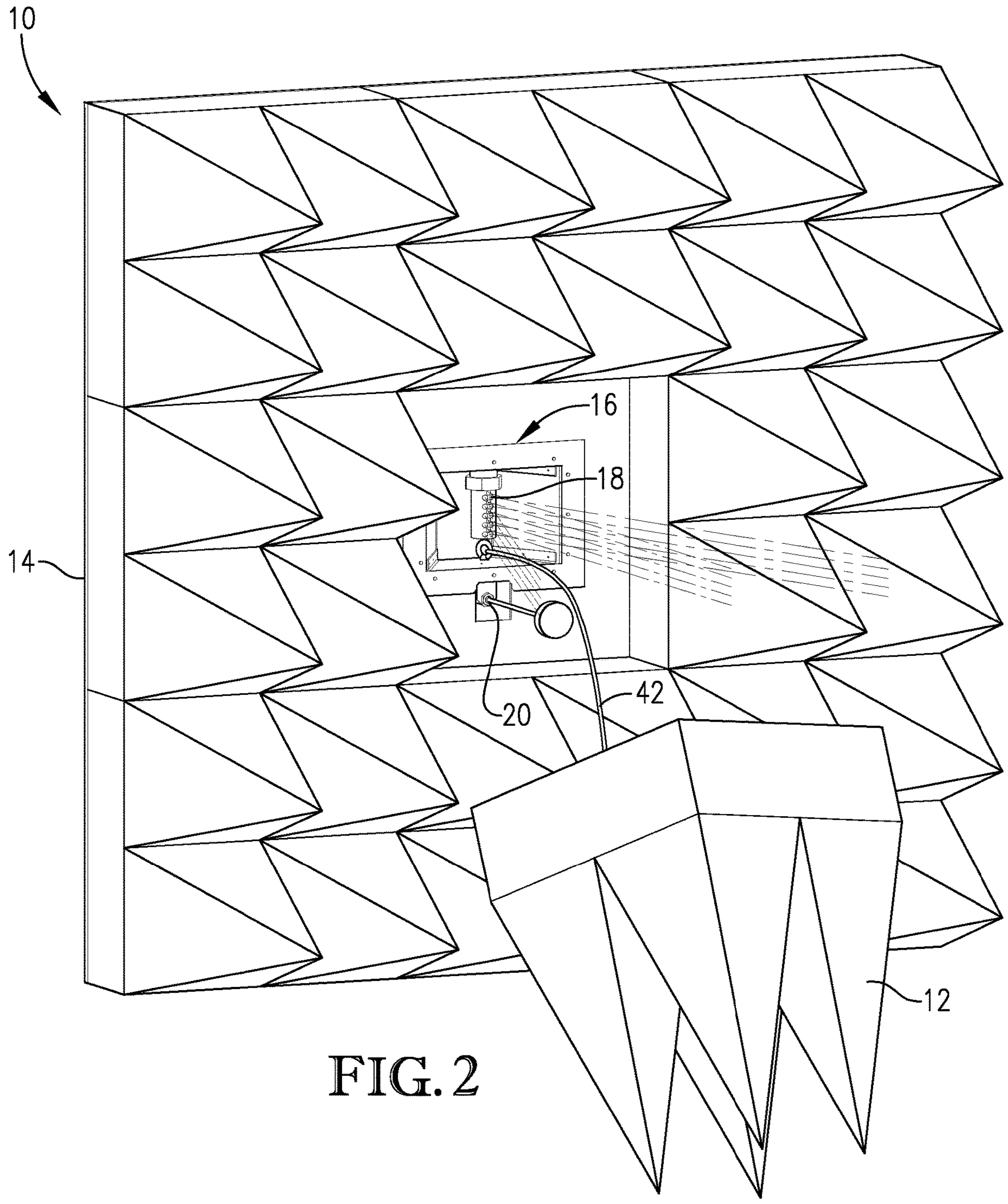
FIG. 2 depicts a wall section comprising an anechoic chamber in which one piece of an acoustic tile has been dislodged to expose a nozzle box unit.

As shown in FIG. 2, behind one piece of acoustic material 12 is a nozzle box unit 16. A nozzle 18 is located inside of the nozzle box unit 16 and is configured to discharge a spray of a fire suppressing material (e.g., an HFC or fluorinated ketone) into the anechoic chamber. Nozzle box unit 16 also includes a pusher assembly 20, shown in its extended position, that is operable to dislodge a piece of the acoustic material 12 thereby uncovering the nozzle box unit 16.

Figure 3:
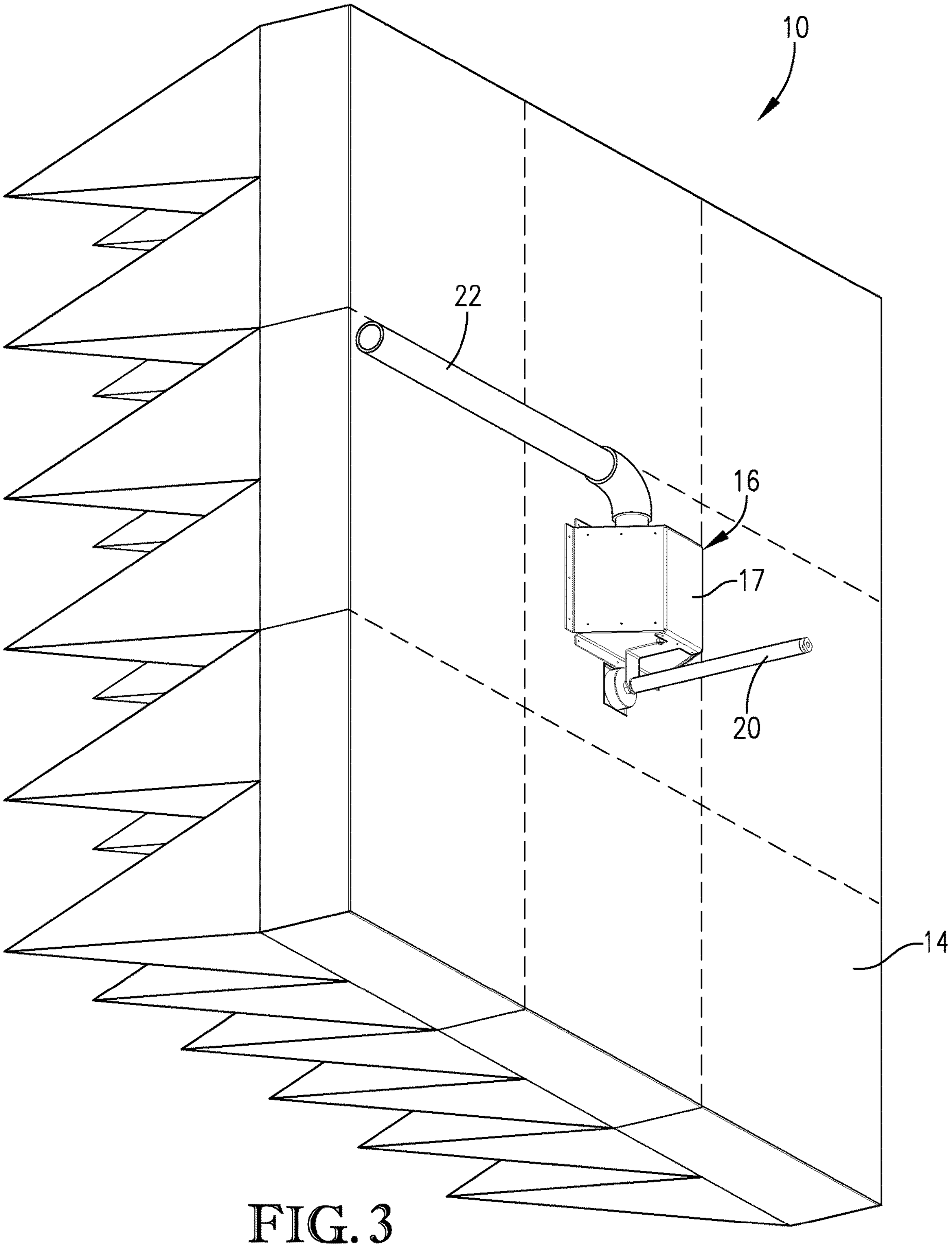
FIG. 3 is a rear view of the wall section of the anechoic chamber showing the nozzle box unit mounted thereto.

FIG. 3 depicts the rear of wall section 10 showing nozzle box unit 16 mounted to wallboard 14. The dashed lines located on wallboard 14 represent the layout of the various pieces of acoustic material 12. Preferably, nozzle box unit 16 positioned centrally behind one piece of acoustic material 12, although as discussed below, this need not always be the case. A conduit 22 is shown connected to the nozzle box unit 16 for connecting nozzle 18 with a source of fire suppressing material.

Figure 4:
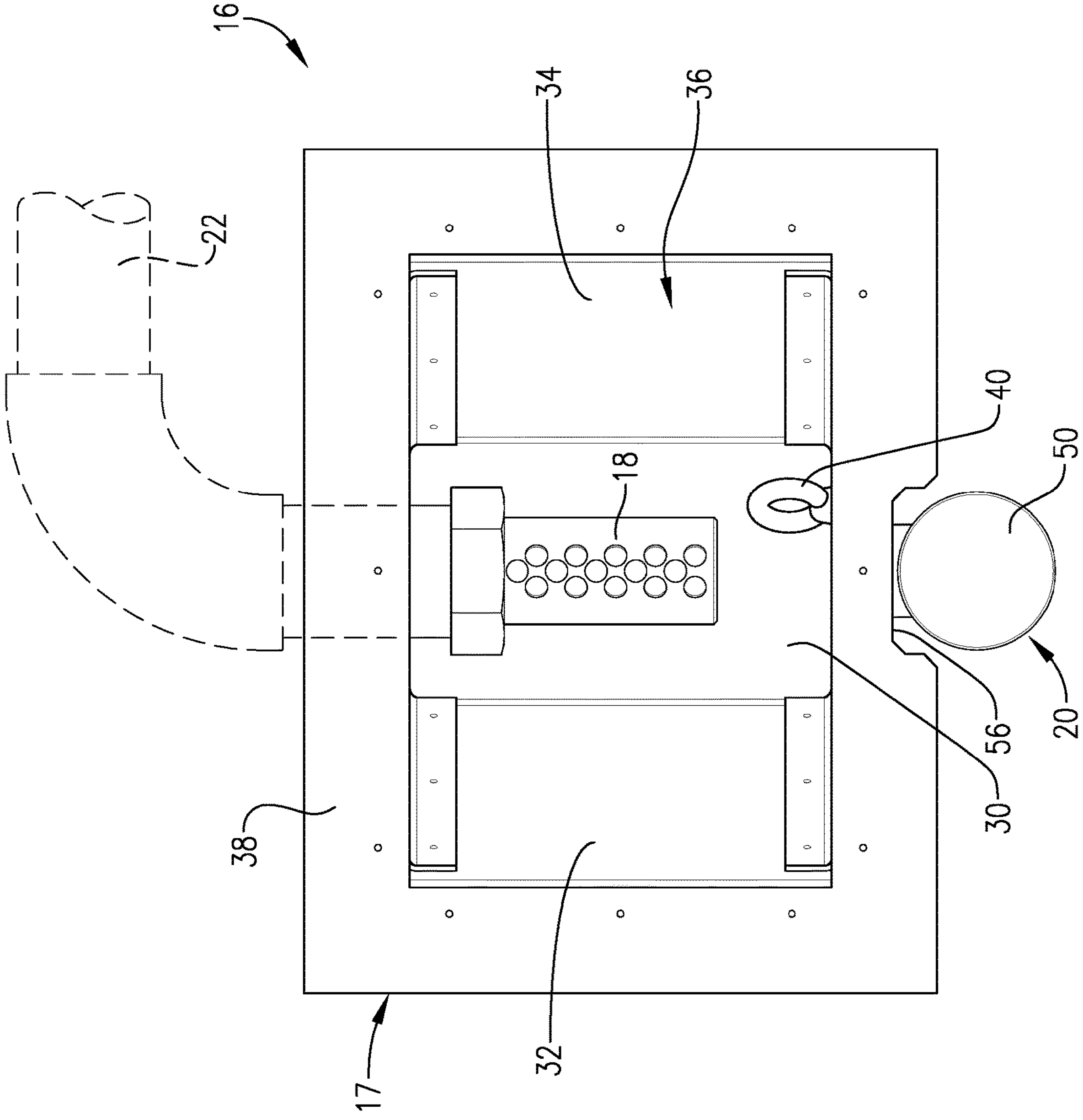
FIG. 4 is a front elevation view of an embodiment of a nozzle box unit including a nozzle installed therein.
Figure 5:
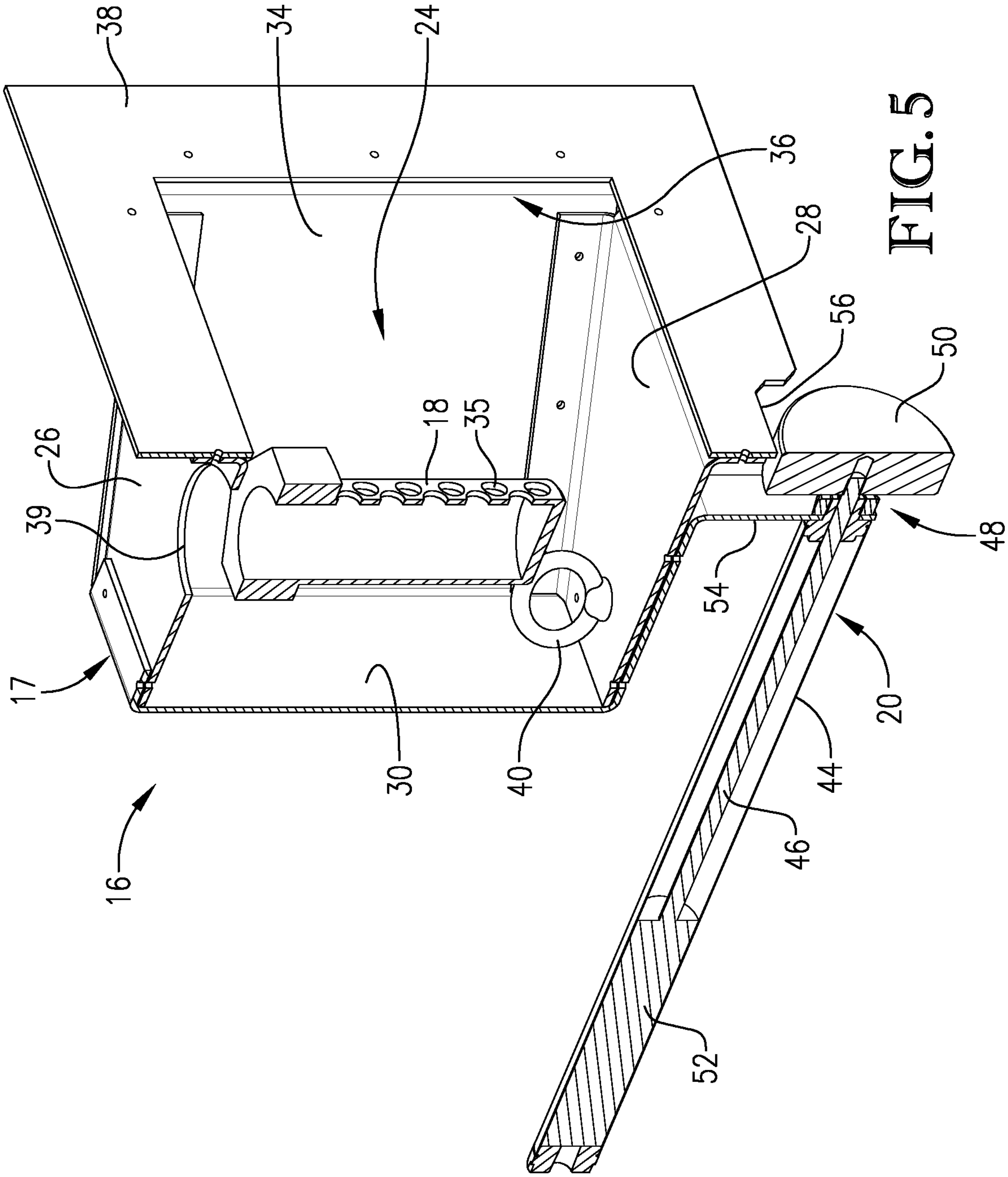
FIG. 5 is a sectioned perspective view of the nozzle box unit of FIG. 4.

Turning to FIGS. 4 and 5, the nozzle box unit 16 is shown in greater detail. The nozzle box unit 16 comprises a nozzle box 17 that includes wall structure defining a compartment 24 inside of which nozzle 18 is located. In one or more embodiments, as depicted, the wall structure includes a top wall 26, a bottom wall 28, a back wall 30, and a pair of sidewalls 32, 34. The sidewalls 32, 34 extend between the back wall 30 and an open face 36 that is located oppose the back wall. Sidewalls 32, 34 also interconnect the top wall 26 and bottom wall 28. Note, the wall structure need not comprise discrete walls as depicted but could be stamped from sheet metal or molded from a plastic material in any number of configurations provided that a compartment for housing the nozzle 18 is formed. In certain embodiments, the nozzle box is tapered between the open face 36 and the back wall 30 so that the nozzle box 17 assumes a generally wedge-like shape, although this need not always be the case.

A flange 38 surrounds at least a portion of, and preferably all of, the open face 36 and is configured to provide structure for attaching the nozzle box unit 16 to a wall defining the anechoic chamber. The open face 36 is configured to permit communication between the compartment 24 and the anechoic chamber, which is external to the nozzle box unit 16.

An opening 39 is formed in top wall 26 to accommodate mounting of the nozzle 18 within the compartment 24. In one or more embodiments, it is desirable to mount nozzle 18 as forward within the compartment 24 as practical. Therefore, in certain embodiments the distance between the opening 39 and the open face 36 is less than the distance between the opening 39 and the back wall 30. In addition, it may be desirable for the open face 36 to have a width that is greater than its height. This permits nozzle 18 to be configured with a wide spray pattern without the spray contacting the nozzle box sidewalls 32, 34.

In one or more embodiments, nozzle 18 is configured to discharge a stream of the fire suppressing material in a spray pattern having an angular expanse of at least 30°, at least 40°, at least 50°, at least 60°, at least 70°, at least 80°, at least 90°, at least 100°, and most preferably about 108°. In particular embodiments, nozzle 18 comprises a plurality of orifices 35 formed in the nozzle body through which the fire suppressing material is discharged. Orifices 35 are generally positioned toward open face 36 so that the fire suppressing material can be discharged without contacting nozzle box sidewalls 32, 34.

In one or more embodiments, the nozzle box 17 is equipped with an anchor structure 40, depicted here as an eye-bolt, to which a tether 42 can be attached. As shown in FIG. 2, the tether 42 secures the acoustic material 12 to the nozzle box unit 16 when the acoustic material 12 becomes dislodged. Thus, tether 42 prevents the acoustic material 12 from falling and becoming damaged itself, or damaging equipment located within the anechoic chamber during testing or actual deployment of the fire suppression system.

The nozzle box unit 16 further comprises a selectively actuatable pusher assembly 20. Pusher assembly 20 is shiftable between a retracted position (see, e.g., FIG. 6) and an extended position (see, e.g., FIG. 7). Thus, pusher assembly 20 is configured to dislodge a piece of acoustic material 12 mounted in front of the nozzle box open face 36 upon shifting from the retracted position to the extended position. By dislodging the piece of acoustic material 12, the open face 36 is unblocked thereby permitting fire suppressing material to be discharged from the nozzle 18 into the anechoic chamber.

The pusher assembly 20 can be configured in a number of ways so that shifting between the retracted and extended position can occur via different means. In one configuration, pusher assembly 20 used a pressurized fluid to effect shifting between the retracted and extended positions. In one particular embodiment, the pressurized fluid is a gas, such as compressed air, nitrogen, or any other pressurized gas supplied from a remote storage vessel. Alternatively, the gas can be generated within the pusher assembly itself, such as through use of a chemical gas-generating cartridge. Still, in another embodiment, the pressurized fluid can be the liquid fire suppressing material that is supplied to nozzles 18. In one other configuration, the pusher assembly 20 can use mechanically stored energy, such as through a spring, to effect shifting between the retracted and extend positions. Still further, the pusher assembly 20 can use an electromechanical actuator, such as a solenoid, to effect shifting between the retracted and extended positions.

As illustrated in the Figures, however, pusher assembly 20 is configured to use a pressurized fluid to effect shifting between the retracted and extended positions. As can be seen in FIG. 5, pusher assembly 20 comprises a cylinder 44 inside of which is located a rod 46. The rod 46 may comprise a distal end 48 that is configured to engage the piece of acoustic material 12. Preferably, distal end 48 comprises a bumper 50 having a diameter that is greater than that of the rod 46 in order to provide greater surface area for contacting of the acoustic material 12. The proximal end of rod 46 may be equipped with a piston head 52 against which the operating gas can act to effect shifting of the rod 46 within the cylinder 44. In one or more embodiments, a spring or other biasing member can be located within the cylinder 44 in order to aid the work of the operating fluid in shifting the pusher assembly between the retracted and extended position, or to oppose the work of the operating fluid so that the pusher assembly 20 will automatically return to the retracted position once the supply of pressurized fluid to the pusher assembly 20 is discontinued. In one or more embodiments, pusher assembly 20 is configured so that the rod 46 shifts rectilinearly, and preferably within a path of travel that is substantially perpendicular to the nozzle box open face 36.

As can be seen in FIG. 5, pusher assembly 20 is attached to nozzle box 17 via a mounting bracket 54 that is secured to the box's bottom wall 28. Although, other means of attaching pusher assembly 20 to nozzle box 17, and other points of attachment to nozzle box 17, so as to form a unitary structure are contemplated herein. However, pusher assembly 20 need not be directly secured to the nozzle box 17, but merely secured to the wall section 10 located in close proximity to it. In one or more embodiments, the rod distal end 48, including bumper 50, is located flush with or behind the open face 36 when the pusher assembly 20 is in the retracted position. Accordingly, flange 38 may be constructed with a recessed area 56 so as to accommodate distal end 48, and bumper 50, when the pusher assembly 20 is in the retracted position and shifting between the retracted and extended positions.

In one or more embodiments, the pusher assembly 20 is configured to contact the piece of acoustic material 12 mounted in front of the nozzle box 17 with a force that is sufficient to dislodge the acoustic material from its position on the wall section 10 so that open face 36 is exposed to the interior of the anechoic chamber. Preferably, the pusher assembly 20 contacts the acoustic material 12 with a force of at least 80 lbf (356 N), at least 90 lbf (400 N), or at least 100 lbf (445 N). Alternatively, the pusher assembly 20 contacts the acoustic material 12 with a force of from about 80 to about 140 lbf (356-623 N), or from about 90 to about 130 lbf (400-578 N), or from about 100 to about 120 lbf (445-534 N).

Figure 8:
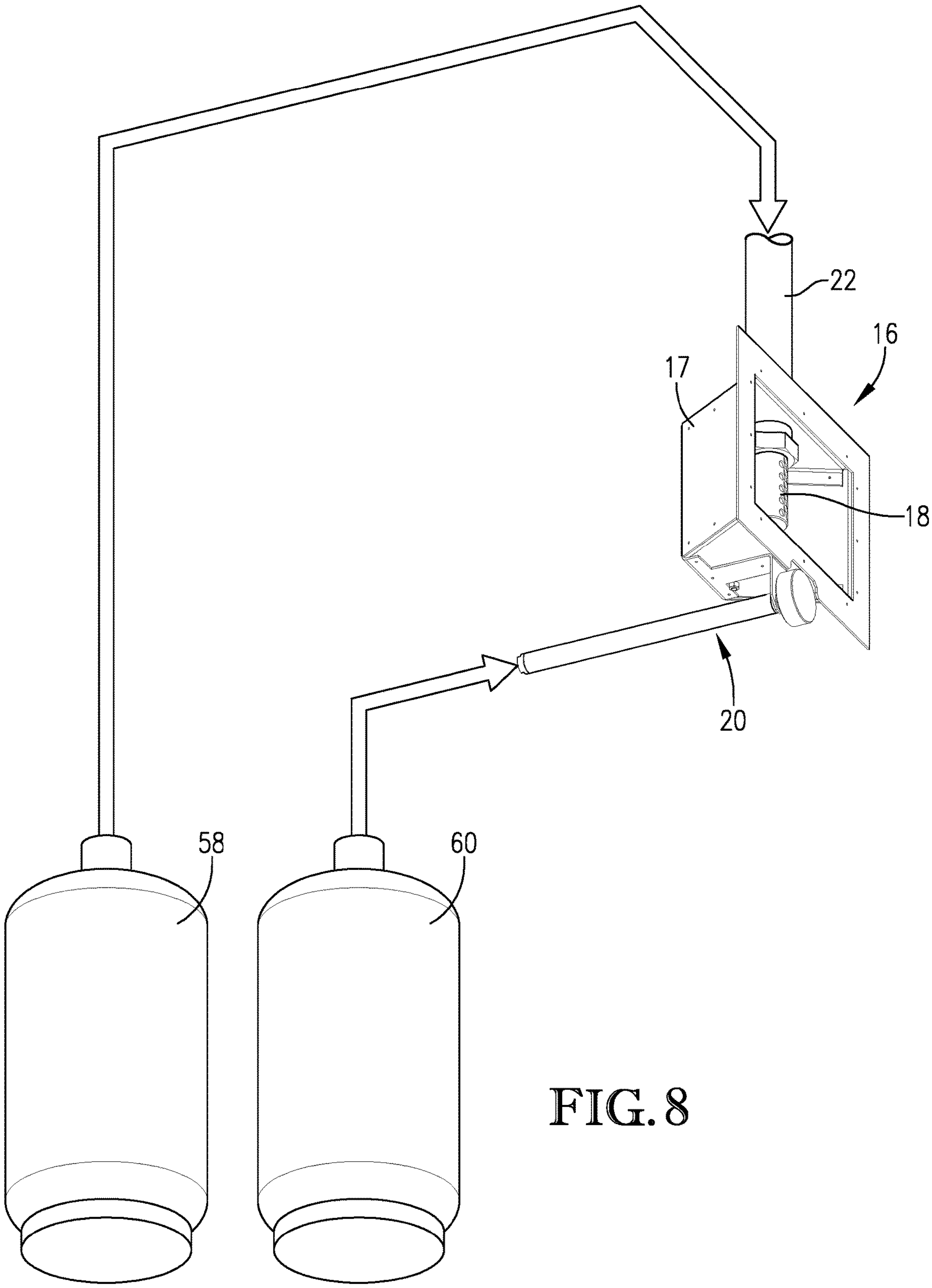
FIG. 8 is a schematic illustration of a fire suppression system according to one embodiment of the present invention in which the pusher assembly is connected to a source of a pressurized gas.
Figure 9:
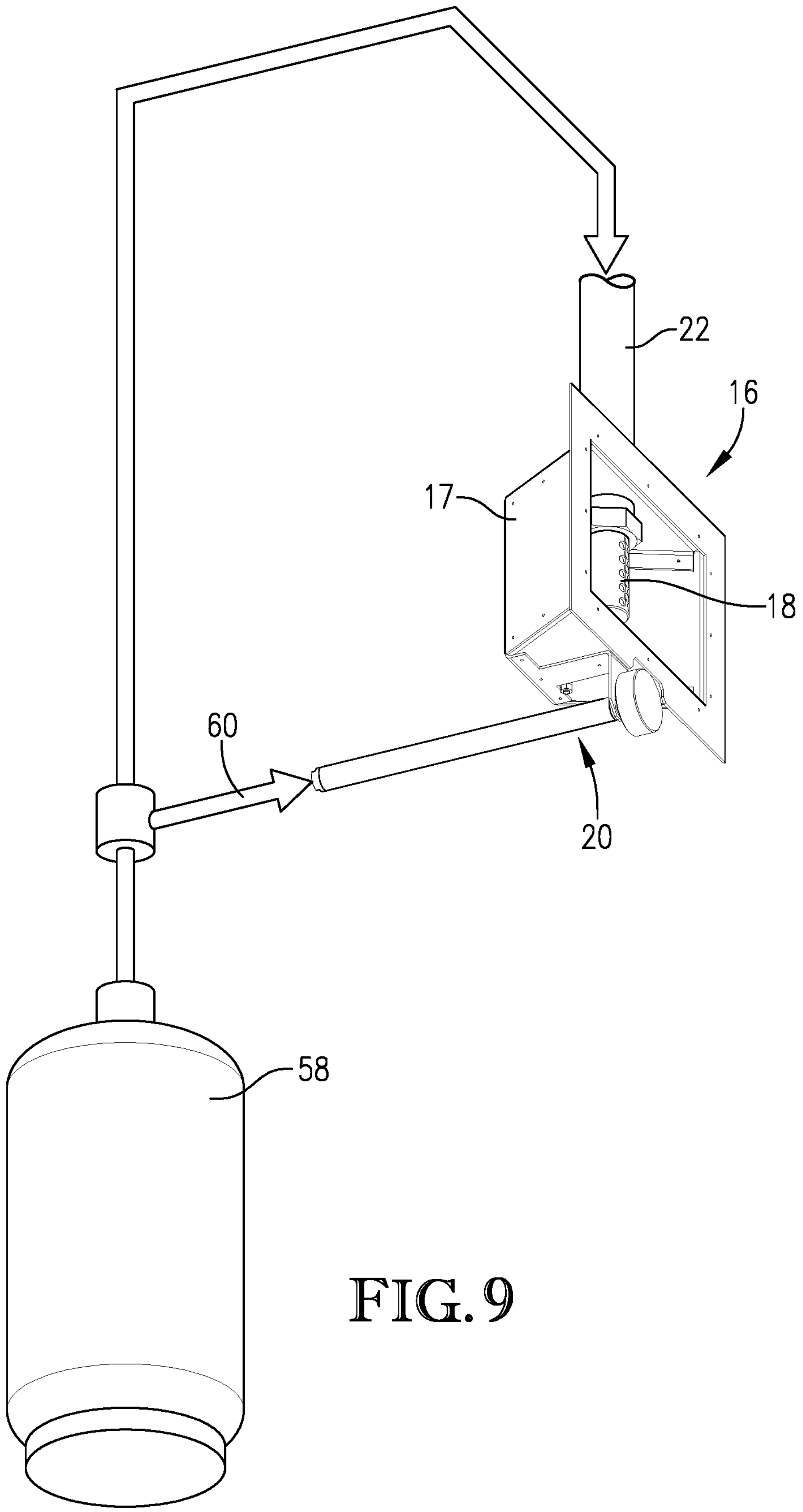
FIG. 9 is a schematic illustration of a fire suppression system according to another embodiment of the present invention in which the pusher assembly is connected to a source of fire suppressing material.

Turning to FIGS. 8 and 9, two different schemes for connecting the pusher assembly 20 to a working fluid for effecting shifting between the retracted and extended positions are illustrated. In the embodiment of FIG. 8, nozzle 18 is connected to a source 58 of fire suppressing material, such as a pressurized vessel. Pusher assembly 20 is connected to a separate source 60 of a pressurized fluid, such as a compressed gas. Thus, the means for controlling shifting of the pusher assembly 20 from the retracted to the extended position is maintained separate from the means for discharging the fire suppressing material from nozzle 18. In the embodiment of FIG. 9, however, the pusher assembly 20 is fluidly connected to the source 58 of the fire suppressing material. A side stream 60 of the fire suppressing material is diverted from conduit 22 and delivered to the pusher assembly 20. In both embodiments, all components of the fire suppression system are located outside of the anechoic chamber, and the fluid supplied to the pusher assembly is capable of supplying the motive force for shifting of the rod 46 within the cylinder 44 to cause the rod distal end 48 to contact the piece of acoustic material 12 with sufficient force to dislodge it. Also, it is understood that a plurality of nozzle box units 16 can be connected to a single source of pressurized fluid/fire suppressing material, and that the overall fire suppression system may comprise multiple pressurized fluid/fire suppressing material reservoirs.

Figure 10:
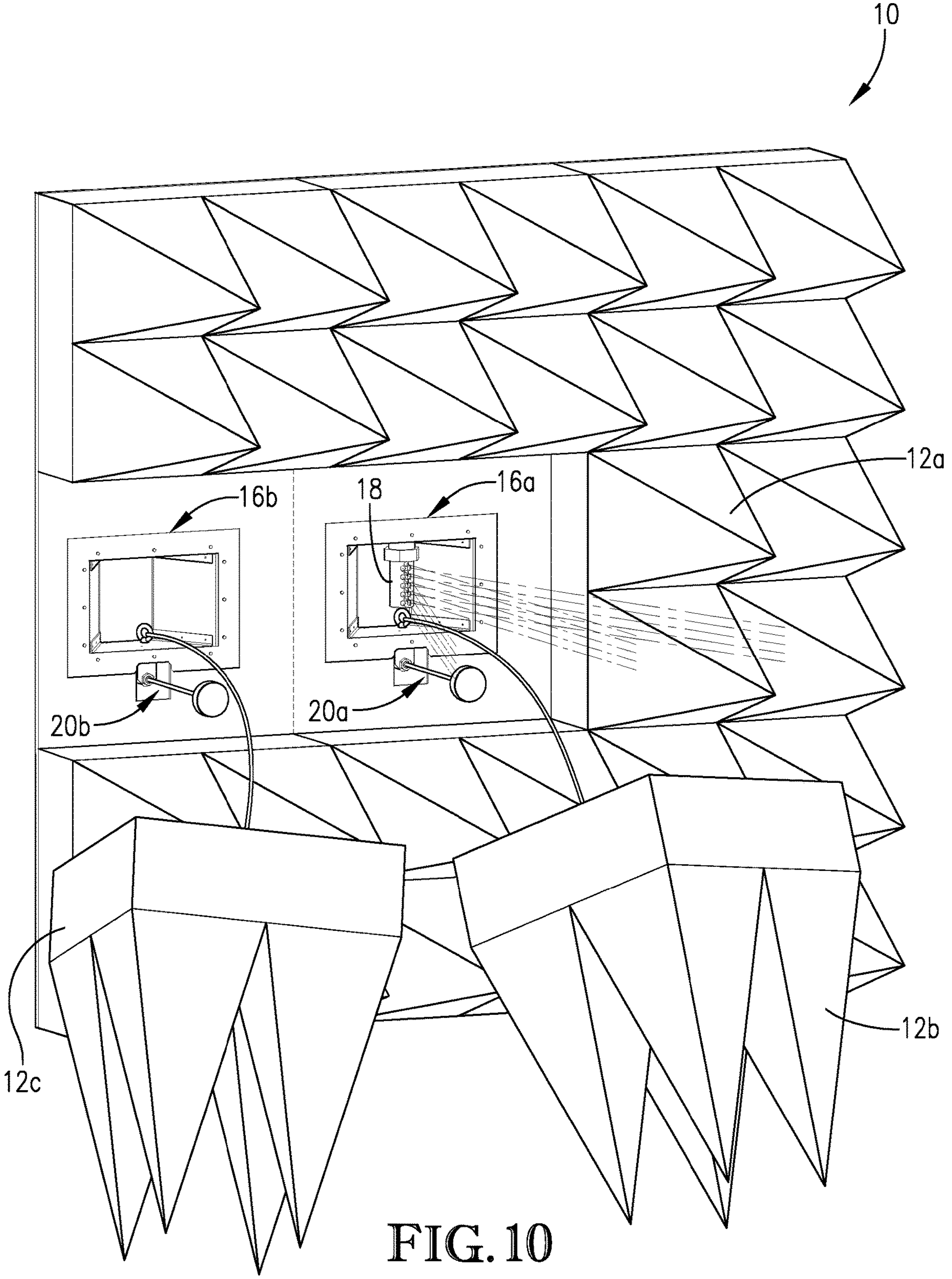
FIG. 10 is a view of a wall section comprising an anechoic chamber in which two nozzle box units are mounted adjacent to each other and configured to dislodge adjacent pieces of acoustic material.

In certain configurations, nozzle box unit 16 is generally centered behind a single piece of acoustic material 12. For example, the left and right margins of nozzle box unit 16 are generally spaced equidistance from the respective proximal margins of the acoustic material 12 to be displaced. This general centering of the nozzle box unit 16 provides the greatest clearance for the nozzle spray pattern from contact with adjacent pieces of acoustic material 12. However, it may not always be possible to align the nozzle box unit 16 with the acoustic material so precisely. As depicted in FIG. 10, the nozzle box unit 16*a* may be skewed toward one lateral margin of the acoustic material (as depicted, nozzle box unit 16*a* is skewed slightly to the left). While the nozzle spray pattern would have no difficulty in clearing the acoustic material 12*a* and 12*b*, which has been displaced by the action of pusher assembly 20*a*, the nozzle spray pattern risks impinging upon acoustic material 12*c*, assuming it remained in place upon the wall section 10. Therefore, to prevent the fire suppressing material emitted from nozzle 18 from contacting acoustic material 12*c*, a second nozzle box unit 16*b* can be installed behind acoustic material 12*c* for the purpose of displacing it from the wall section 10. Note, the device installed behind acoustic material 12*c* need not comprise an entire nozzle box unit 16*b*. Rather, it is within the scope of the present invention for the device to comprise only a secondary pusher assembly 20*b*.

Preferably, the secondary nozzle box unit 16*b* comprises a secondary pusher assembly 20*b* and is laterally disposed from the primary nozzle box unit 16*a*. The secondary pusher assembly 20*b* is configured to dislodge a second piece of acoustic material 12*c* that is located adjacent to the first piece of acoustic material 12*b* dislodged by the primary pusher assembly 20*a*. By dislodging the second piece of acoustic material 12*c*, greater clearance for the spray pattern emitted from nozzle 18 is provided. As the purpose of the secondary nozzle box unit 16*b* is to dislodge the second piece of acoustic material 12*c*, the secondary nozzle boxy unit 16*b* need not include a nozzle for dispensing fire suppressing material.

One or more embodiments of the present invention also pertain to methods of suppressing a fire within an anechoic chamber that comprises a plurality of pieces of mounted to one or more walls defining the chamber. Initially, one or more conditions indicative of a fire event would be detected within the anechoic chamber. Detection of the one or more conditions could be accomplished using equipment known in the art including various smoke detectors, heat detectors, flame detectors, carbon monoxide detectors. In addition, the fire suppressing system can also be equipped with manual activation stations so that a human operator within or near the anechoic chamber can initiate the flow of fire suppressing material into the chamber.

Figure 6:
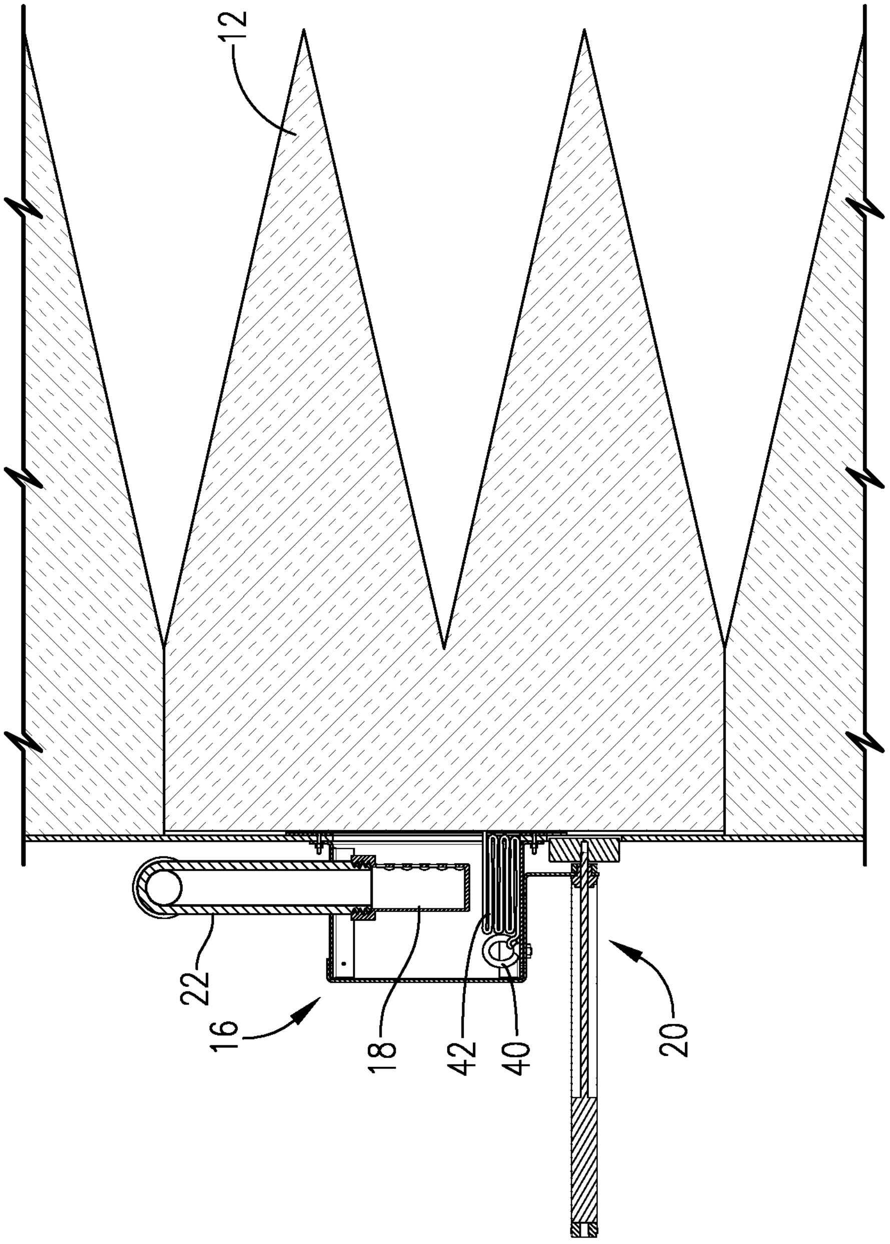
FIG. 6 is a sectioned side elevation view depicting the nozzle box unit mounted to a wall section of an anechoic chamber and with a pusher assembly in the retracted position.
Figure 7:
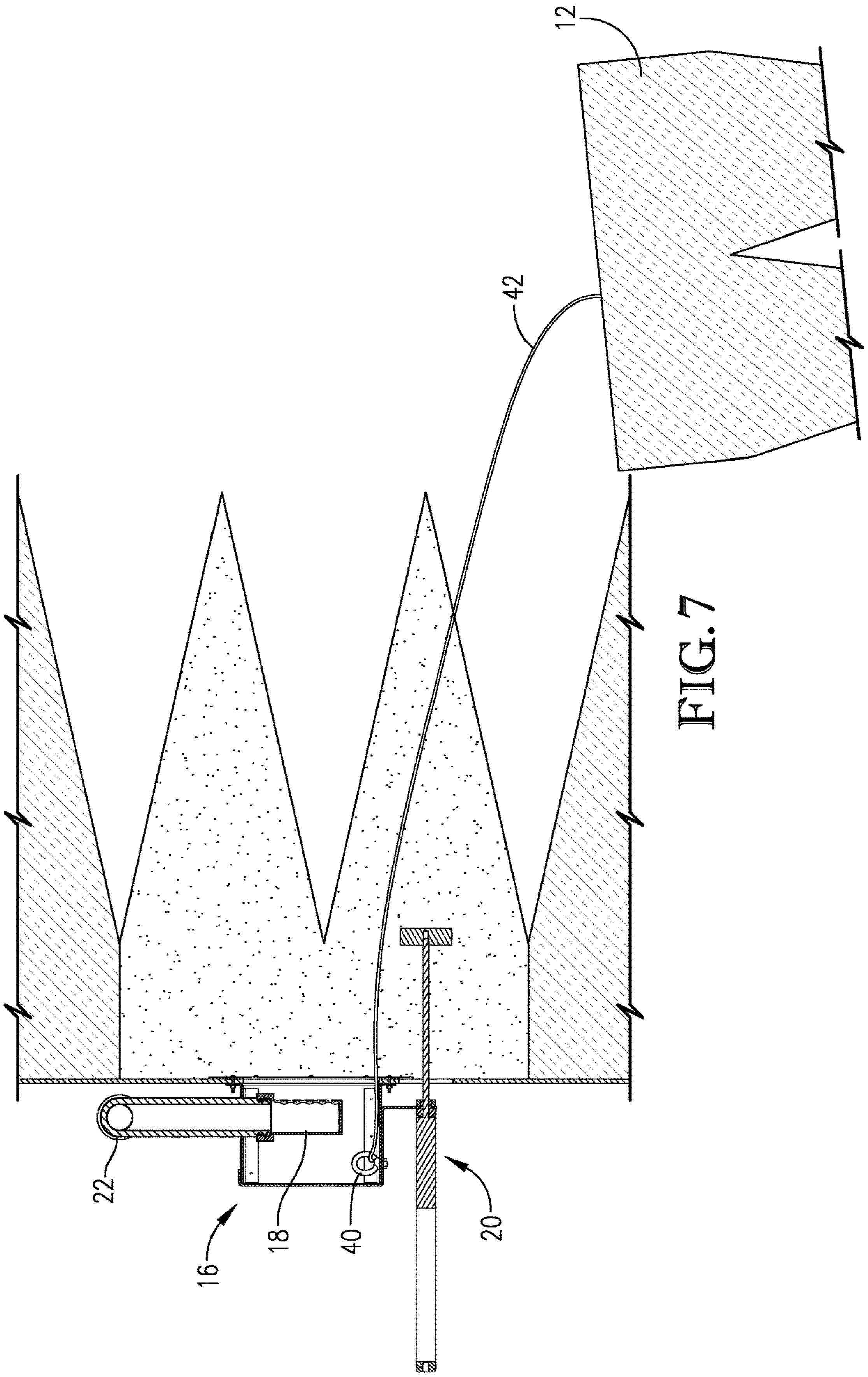
FIG. 7 is a sectioned side elevation view depicted the nozzle box unit mounted to a wall section of an anechoic chamber and with the pusher assembly in the extended position displacing a piece of acoustic material.

A control panel can be included with the fire suppression system to receive the signal from the one or more detectors or manual activation stations and initiate a flow of fire suppressing material from a fire suppressing material reservoir located external to the anechoic chamber toward at least one nozzle box unit 16. With reference to FIGS. 6 and 7, a nozzle 18 installed within the nozzle box unit 16 is fluidly connected to the reservoir and configured to discharge the fire suppressing material into the anechoic chamber. At a point prior to, concurrent with, or subsequent to initiation of the flow of fire suppressing material, pusher assembly 20 is activated causing a shift of the pusher assembly 20 from the retracted position shown in FIG. 6 to the extended position shown in FIG. 7 thereby dislodging at least one of the plurality of pieces of acoustic material 12 mounted in front of the nozzle box open face and unblocking the open face of the nozzle box unit 16.

In one or more embodiments, the activation of pusher assembly 12 is accomplished by initiating a flow of pressurized fluid from a pressurized fluid reservoir 60 (see, FIG. 8). Alternatively, a portion of the flow of the fire suppressing material from the fire suppressing material reservoir 58 (see, FIG. 9) is directed toward the pusher assembly 20. In either embodiment, the flow of the pressurized fluid causes the rod 46 located inside of cylinder 44 to shift along a path of travel that is substantially perpendicular to the open face 36 from the retracted position to the extended position. The piece of acoustic material 12 is then dislodged and falls out from in front of the open face 36 while being secured to the nozzle box unit 16 by tether 42.

The fire suppressing material is then discharged through the nozzle 18 into the anechoic chamber. As noted above, nozzle 18 has a predetermined spray pattern, which preferably does not impinge upon either the nozzle box 17 or the acoustic material 12 once the piece of acoustic material 12 originally positioned in front of open face 36 has been dislodged.

We claim:

1. A nozzle box unit comprising:

a nozzle box configured to hold a nozzle operable to deliver a fire suppressing material into an anechoic chamber, the nozzle box comprising wall structure defining a compartment inside of which the nozzle is located, and an open face that is configured to permit communication between the compartment and an anechoic chamber external to the nozzle box; and a selectively actuatable pusher assembly, the pusher assembly being shiftable between a retracted position and an extended position, the pusher assembly being configured to dislodge a piece of acoustic material mounted in front of the nozzle box open face upon shifting from the retracted position to the extended position thereby permitting discharge of the fire suppressing material from the nozzle into the anechoic chamber, wherein the nozzle box wall structure comprises top and bottom walls, a back wall opposite the open face, and a pair of sidewalls extending between the back wall and open face and interconnecting the top and bottom walls, wherein the top wall comprises an opening to accommodate mounting of a nozzle within the compartment.

2. The nozzle box unit of claim 1, wherein the nozzle box is tapered between the open face and the back wall.

3. The nozzle box unit of claim 1, wherein the nozzle box unit comprises a flange located around the open face and configured to attach the nozzle box unit to a wall defining the anechoic chamber.

4. The nozzle box unit of claim 1, wherein a distance between the opening and the open face is less than a distance between the opening and the back wall.

5. The nozzle box unit of claim 1, wherein a width of the open face is greater than a height of the open face.

6. A nozzle box unit comprising:

a nozzle box configured to hold a nozzle operable to deliver a fire suppressing material into an anechoic chamber, the nozzle box comprising wall structure defining a compartment inside of which the nozzle is located, and an open face that is configured to permit communication between the compartment and an anechoic chamber external to the nozzle box; and a selectively actuatable pusher assembly, the pusher assembly being shiftable between a retracted position and an extended position, the pusher assembly being configured to dislodge a piece of acoustic material mounted in front of the nozzle box open face upon shifting from the retracted position to the extended position thereby permitting discharge of the fire suppressing material from the nozzle into the anechoic chamber, wherein the pusher assembly comprises a cylinder inside of which is located a rod, the rod having a distal end configured to engage the piece of acoustic material.

7. The nozzle box unit of claim 6, wherein the distal end comprises a bumper having a diameter greater than that of the rod.

8. The nozzle box unit of claim 6, wherein the rod has a path of travel that is substantially perpendicular to the open face.

9. The nozzle box unit of claim 6, wherein the distal end is located flush with or behind the open face when the pusher assembly is in the retracted position.

10. The nozzle box unit of claim 1, wherein the pusher assembly is configured to be connected to a source of a pressurized fluid.

11. The nozzle box unit of claim 10, wherein the source of the pressurized fluid is a pressurized gas reservoir or a pressurized fire suppressing material reservoir.

12. The nozzle box unit of claim 1, wherein the pusher assembly is configured to contact the piece of acoustic material mounted in front of the nozzle box with a force of at least 80 lbf.

13. The nozzle box unit of claim 1, wherein the pusher assembly is mounted to the nozzle box.

14. A fire suppression system for an anechoic chamber, the fire suppression system comprising:

at least one nozzle box comprising wall structure defining a compartment, and an open face that is configured to permit communication between the compartment and the anechoic chamber;

a nozzle located within the compartment that is fluidly connected to a source of a fire suppressing material, the nozzle being configured to discharge a stream of the fire suppressing material into the anechoic chamber;

a selectively actuatable pusher assembly, the pusher assembly being shiftable between a retracted position and an extended position, the pusher assembly being operable to dislodge a piece of acoustic material mounted in front of the nozzle box open face within the anechoic chamber upon shifting from the retracted position to the extended position thereby permitting discharge of the fire suppressing material from the nozzle into the anechoic chamber, wherein the pusher assembly comprises a cylinder inside of which is located a rod, the rod having a distal end configured to engage the piece of acoustic material.

15. The fire suppression system of claim 14, wherein the nozzle is connected to a source of a fire suppressing material.

16. The fire suppression system of claim 14, wherein the pusher assembly is connected to a source of a pressurized fluid capable of supplying a motive force for shifting of the rod within the cylinder and to cause the distal end to contact the piece of acoustic material mounted in front of the nozzle box with a force of at least 80 lbf.

17. A fire suppression system for an anechoic chamber, the fire suppression system comprising:

at least one nozzle box comprising wall structure defining a compartment, and an open face that is configured to permit communication between the compartment and the anechoic chamber;

a nozzle located within the compartment that is fluidly connected to a source of a fire suppressing material, the nozzle being configured to discharge a stream of the fire suppressing material into the anechoic chamber;

a selectively actuatable pusher assembly, the pusher assembly being shiftable between a retracted position and an extended position, the pusher assembly being operable to dislodge a piece of acoustic material mounted in front of the nozzle box open face within the anechoic chamber upon shifting from the retracted position to the extended position thereby permitting discharge of the fire suppressing material from the nozzle into the anechoic chamber, wherein the fire suppression system further comprises a secondary pusher assembly that is laterally disposed from the at least one nozzle box, the secondary pusher assembly being configured to dislodge a second piece of acoustic material located adjacent to the piece of acoustic material dislodged by the pusher assembly associated with the at least one nozzle box.

18. The fire suppression system of claim 14, wherein the nozzle is configured to discharge the stream of the fire suppressing material in a spray pattern having an angular expanse of at least 30°.

19. The fire suppression system of claim 14, wherein the nozzle box wall structure comprises top and bottom walls, a back wall opposite the open face, and a pair of sidewalls extending between the back wall and open face and interconnecting the top and bottom walls.

20. The fire suppression system of claim 19, wherein a distance between the nozzle and the open face is less than a distance between the nozzle and the back wall.

21. The fire suppression system of claim 14, wherein the pusher assembly is mounted to the nozzle box.

22. A method of suppressing a fire within an anechoic chamber comprising a plurality of pieces of acoustic material mounted to one or more walls defining the chamber, the method comprising:

(a) detecting within the anechoic chamber one or more conditions indicative of a fire event;

(b) activating a flow of a fire suppressing material from a fire suppressing material reservoir located external to the anechoic chamber toward at least one nozzle box, the at least one nozzle box comprising wall structure defining a compartment, and an open face that is configured to permit communication between the compartment and the anechoic chamber, a nozzle located within the compartment that is fluidly connected to the reservoir, and a selectively actuatable pusher assembly, the pusher assembly being shiftable between a retracted position and an extended position, the pusher assembly being operable to dislodge at least one of the plurality of pieces of acoustic material that is mounted in front of the nozzle box open face, wherein the nozzle box wall structure comprises top and bottom walls, a back wall opposite the open face, and a pair of sidewalls extending between the back wall and open face and interconnecting the top and bottom walls, wherein the top wall comprises an opening to accommodate mounting of a nozzle within the compartment;

(c) causing the pusher assembly to shift from the retracted position to the extended position, the shifting dislodging at least one of the plurality of pieces of acoustic material that is mounted in front of the nozzle box open face thereby unblocking the open face of at least one nozzle box; and (d) discharging the fire suppressing material through the nozzle into the anechoic chamber.

23. The method of claim 22, wherein step (c) comprises initiating a flow of a pressurized fluid from a pressurized fluid reservoir into the pusher assembly thereby effecting shifting of the pusher assembly from the retracted position to the extended position.

24. The method of claim 22, wherein at least a portion of the flow of fire suppressing material from the fire suppressing material reservoir is directed toward the pusher assembly thereby effecting shifting of the pusher assembly from the retracted position to the extended position.

25. The method of claim 22, wherein the method further comprises dislodging one other of the plurality of pieces of acoustic material adjacent to the at least one piece of acoustic material that is mounted in front of the nozzle box open face.

26. The method of claim 22, wherein the pusher assembly comprises a cylinder inside of which is located a rod, the rod having a distal end configured to engage the piece of acoustic material, and wherein the shifting of the pusher assembly from the retracted position to the extended position comprises shifting of the rod along a path of travel that is substantially perpendicular to the open face.

27. The method of claim 22, wherein step (d) comprises discharging the stream of the fire suppressing material in a spray pattern having an angular expanse of at least 30°.

28. The method of claim 22, wherein step (d) is performed without contacting any of the plurality of pieces of acoustic material with the stream of fire suppressing material discharged through the nozzle.

29. The method of claim 22, wherein step (d) is performed without contacting any surface of the nozzle box wall structure with the stream of fire suppressing material discharged through the nozzle.

30. A method of suppressing a fire within an anechoic chamber comprising a plurality of pieces of acoustic material mounted to one or more walls defining the chamber, the method comprising:

(a) detecting within the anechoic chamber one or more conditions indicative of a fire event;

(b) activating a flow of a fire suppressing material from a fire suppressing material reservoir located external to the anechoic chamber toward at least one nozzle box, the at least one nozzle box comprising wall structure defining a compartment, and an open face that is configured to permit communication between the compartment and the anechoic chamber, a nozzle located within the compartment that is fluidly connected to the reservoir, and a selectively actuatable pusher assembly, the pusher assembly being shiftable between a retracted position and an extended position, the pusher assembly being operable to dislodge at least one of the plurality of pieces of acoustic material that is mounted in front of the nozzle box open face, wherein the pusher assembly comprises a cylinder inside of which is located a rod, the rod having a distal end configured to engage the piece of acoustic material;

(c) causing the pusher assembly to shift from the retracted position to the extended position, the shifting dislodging at least one of the plurality of pieces of acoustic material that is mounted in front of the nozzle box open face thereby unblocking the open face of at least one nozzle box; and (d) discharging the fire suppressing material through the nozzle into the anechoic chamber.

* * * * *